(12) United States Patent
Lee et al.

(10) Patent No.: US 8,124,294 B2
(45) Date of Patent: Feb. 28, 2012

(54) POLYMER ELECTROLYTE MEMBRANE COMPRISING INORGANIC NANOPARTICLE BONDED WITH PROTON-CONDUCTING GROUP AND SOLID ACID, FUEL CELL INCLUDING THE SAME, AND METHOD OF PREPARING THE POLYMER ELECTROLYTE MEMBRANE

(75) Inventors: Jin-gyu Lee, Yongin-si (KR); Myung-sup Jung, Yongin-si (KR); Jae-jun Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1323 days.

(21) Appl. No.: 11/694,730

(22) Filed: Mar. 30, 2007

(65) Prior Publication Data

US 2008/0085441 A1    Apr. 10, 2008

(30) Foreign Application Priority Data

Oct. 4, 2006    (KR) .................. 10-2006-0097603

(51) Int. Cl.
*H01M 8/10* (2006.01)
(52) U.S. Cl. ......... 429/491; 429/492; 429/479; 429/480
(58) Field of Classification Search .............. 429/33, 429/12, 491, 492, 485, 487, 479, 480, 481, 429/482, 483, 484
See application file for complete search history.

(56) References Cited

U.S. PATENT DOCUMENTS

| | | | |
|---|---|---|---|
| 4,594,297 A * | 6/1986 | Polak et al. .................. 429/442 |
| 7,011,905 B2 * | 3/2006 | Sakamoto et al. ............. 429/33 |
| 7,125,621 B2 | 10/2006 | Haile et al. |
| 7,378,471 B2 * | 5/2008 | Kim et al. .................. 525/328.8 |
| 7,465,780 B2 * | 12/2008 | Jung et al. .................. 528/310 |
| 2003/0091883 A1 | 5/2003 | Peled et al. |
| 2003/0175569 A1 * | 9/2003 | Inagaki et al. ................ 429/30 |
| 2004/0115516 A1 | 6/2004 | Miyake et al. |
| 2005/0112440 A1 | 5/2005 | Kim et al. |
| 2005/0282052 A1 | 12/2005 | Kim et al. |
| 2006/0141316 A1 | 6/2006 | Kang |
| 2009/0152114 A1 * | 6/2009 | Kawabata et al. ............ 204/451 |

FOREIGN PATENT DOCUMENTS

| | | |
|---|---|---|
| CN | 1385915 A | 12/2002 |
| CN | 1461070 A | 12/2003 |
| CN | 1794363 A | 6/2006 |
| EP | 1 309 025 A2 | 5/2003 |
| JP | 2000-357524 | 12/2000 |

(Continued)

OTHER PUBLICATIONS

Chinese Office action dated Dec. 5, 2008, for corresponding Chinese application 2007100914421.

(Continued)

*Primary Examiner* — Melvin Mayes
*Assistant Examiner* — Melissa Stalder
(74) *Attorney, Agent, or Firm* — Christie, Parker & Hale, LLP

(57) ABSTRACT

Provided is a polymer electrolyte membrane including an inorganic nanoparticle bonded with a proton-conducting group, a solid acid and a proton-conducting polymer. The inorganic nanoparticle bonded with the proton-conducting group may be obtained by reacting a compound including a proton-conducting group with a metal precursor. The polymer electrolyte membrane has significantly enhanced proton conductivity and reduced methanol crossover.

20 Claims, 4 Drawing Sheets

FOREIGN PATENT DOCUMENTS

| | | |
|---|---|---|
| JP | 2003-178777 | 6/2003 |
| JP | 2003-520412 | 7/2003 |
| JP | 2005-025943 | 1/2005 |
| JP | 2005-126721 | 5/2005 |
| JP | 2005-232456 | 9/2005 |
| JP | 2006-244920 | 9/2006 |
| KR | 2003-0035190 | 5/2003 |
| KR | 10-2004-0047706 | 6/2004 |
| KR | 10-2005-0094935 | 9/2005 |
| KR | 10-2005-0119888 | 12/2005 |
| KR | 10-2006-0072508 | 6/2006 |
| WO | WO 2004067640 A2 * | 8/2004 |

OTHER PUBLICATIONS

Korean Patent Abstracts, Publication No. 1020050094935 A; Publication Date: Sep. 29, 2005; in the name of Ho Deog Jang.

Chinese Registration Determination Certificate dated Sep. 23, 2009, for corresponding Chinese application 200710091442.1.

KIPO Registration Determination Certificate, dated Jul. 7, 2008, for Korean priority Patent application 10-2006-0097603.

Japanese Office action dated May 17, 2011, for corresponding Japanese Patent application 2007-260226.

English machine translation of Japanese Publication 2006-244920.

* cited by examiner

POLYMER ELECTROLYTE MEMBRANE COMPRISING INORGANIC NANOPARTICLE BONDED WITH PROTON-CONDUCTING GROUP AND SOLID ACID, FUEL CELL INCLUDING THE SAME, AND METHOD OF PREPARING THE POLYMER ELECTROLYTE MEMBRANE

CROSS-REFERENCE TO RELATED PATENT APPLICATION

This application claims priority to and the benefit of Korean Patent Application No. 10-2006-0097603, filed on Oct. 4, 2006, in the Korean Intellectual Property Office, the disclosure of which is incorporated herein in its entirety by reference.

BACKGROUND OF THE INVENTION

1. Field of the Invention

The present invention relates to a polymer electrolyte membrane comprising an inorganic nanoparticle bonded with a proton-conducting group, a solid acid and a proton-conducting polymer, a fuel cell including the same, and a method of preparing the polymer electrolyte membrane.

2. Description of the Related Art

A fuel cell is an electrochemical device, which directly transforms chemical energy of both oxygen and hydrogen contained in a hydrocarbon-based material, such as methanol, ethanol, or natural gas into electrical energy. Since energy conversion processes of fuel cells are very efficient and environmentally friendly, fuel cells have been highlighted and variously developed.

According to the electrolyte that is used, fuel cells can be categorized into phosphoric acid type fuel cells (PAFC), molten carbonate type fuel cells (MCFC), solid oxide type fuel cells (SOFC), polymer electrolyte membrane fuel cells (PEMFC), alkali type fuel cells (AFC), and the like. These fuel cells operate based on the same principle, but have different fuels, different operating temperatures, different catalysts, different electrolytes, etc. Among these fuel cells, PEMFCs are widely considered the most promising fuel cells used in small-sized stationary power generation devices and also transportation systems. This is because PEMFCs have a lower operating temperature, high output density, faster start-up, and a quicker response to a change of output requirement than the other fuel cells mentioned above.

A polymer electrolyte membrane acts as a separator to prevent direct contact between an oxidizing agent and a reducing agent, electrically insulates an anode and a cathode and also acts as a proton conductor. A polymer electrolyte membrane therefore requires good proton conductivity, a good electrical insulating property, low reactant permeability, excellent thermal, chemical and mechanical stability under normal conditions of fuel cell operation, and should be capable of being easily formed in a thin layer and inexpensive.

To satisfy the above requirements, various polymer electrolyte membranes have been developed. For example, a highly fluorinated polysulfonic acid membrane such as NAFION™ membrane is a standard due to excellent durability and performance. However, a NAFION membrane has to be sufficiently humidified to operate well, has to be used at 80° C. or less for preventing moisture loss, and is unstable under operating conditions of a fuel cell because the carbon-carbon bond of a main chain of the NAFION membrane is attacked by oxygen ($O_2$).

In addition, in the case of a direct methanol fuel cell (DMFC), an aqueous methanol solution is supplied to an anode as a fuel. At this time, a part of an unreacted aqueous methanol solution permeates into a polymer electrolyte membrane of the DMFC. The aqueous methanol solution that has permeated into the polymer electrolyte membrane causes a swelling phenomenon in the membrane, thereby being diffused and transferred to a catalyst layer. Such a phenomenon is referred to as "methanol crossover." Since methanol is directly oxidized in a cathode where electrochemical reduction of hydrogen ions and oxygen occurs, the methanol crossover results in a drop in the electric potential of the cathode, thereby causing a significant decline in the performance of the fuel cell.

Such problems are common problems in fuel cells that use a liquid fuel including polar organic fuels in addition to methanol. Therefore, there is a need for a polymer electrolyte membrane with both reduced methanol crossover and good proton conductivity.

SUMMARY OF THE INVENTION

One embodiment of the present invention provides a polymer electrolyte membrane having enhanced proton conductivity and effectively reduced methanol crossover.

An embodiment of the present invention also provides a fuel cell including the polymer electrolyte membrane.

Another embodiment of the present invention also provides a method of preparing the polymer electrolyte membrane.

According to an embodiment of the present invention, a polymer electrolyte membrane is provided comprising an inorganic nanoparticle bonded with a proton-conducting group, a solid acid and a proton-conducting polymer.

The inorganic nanoparticle bonded with the proton-conducting group is the resulting product obtained by reacting a compound comprising the proton-conducting group with a metal precursor.

The metal precursor may be a compound represented by Formula 1 or 2 below:

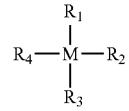

Formula (1)

where M is Si, Ti or Zr, and $R_1$, $R_2$, $R_3$ and $R_4$ are each independently a $C_1$-$C_{20}$ alkyl group, a $C_6$-$C_{20}$ aryl group, a $C_1$-$C_{20}$ alkoxy group, a $C_7$-$C_{20}$ alkylaryl group, a $C_7$-$C_{20}$ arylalkyl group, a $C_2$-$C_{20}$ alkenyl group, a $C_8$-$C_{20}$ arylalkenyl group, a $C_2$-$C_{20}$ alkynyl group, a hydroxyl group, a nitro group or an amino group, wherein at least one of $R_1$, $R_2$, $R_3$ and $R_4$ may be a $C_1$-$C_{20}$ alkoxy group.

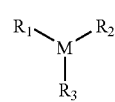

Formula (2)

where M is Al or B, and $R_1$, $R_2$ and $R_3$ are each independently a $C_1$-$C_{20}$ alkyl group, a $C_6$-$C_{20}$ aryl group, a $C_1$-$C_{20}$ alkoxy group, a $C_7$-$C_{20}$ alkylaryl group, a $C_7$-$C_{20}$ arylalkyl group, a $C_2$-$C_{20}$ alkenyl group, a $C_8$-$C_{20}$ arylalkenyl group, a $C_2$-$C_{20}$ alkynyl group, a hydroxyl group, a nitro group, or an amino group, wherein at least one of $R_1$, $R_2$ and $R_3$ may be a $C_1$-$C_{20}$ alkoxy group.

According to another embodiment of the present invention, a fuel cell is provided including a cathode having a catalyst layer and a diffusion layer; an anode having a catalyst layer and a diffusion layer; and an electrolyte membrane interposed between the cathode and the anode, wherein the electrolyte membrane is the polymer electrolyte membrane according to one of embodiments of the present invention.

According to still another embodiment of the present invention, a method of preparing a polymer electrolyte membrane is provided comprising: adding a compound comprising a proton-conducting group to a compound represented by Formula 1 or 2 below and stirring the mixture, and then adding water to the resulting product to prepare an inorganic nanoparticle bonded with a proton-conducting group in a sol-type form; supplying a composition for preparing a polymer electrolyte membrane comprising the inorganic nanoparticle bonded with a proton-conducting group in a sol-type form, a proton-conducting polymer, a solid acid and a solvent; applying the composition for preparing the polymer electrolyte membrane; and drying the applied composition for preparing the polymer electrolyte membrane.

The polymer electrolyte membrane in an embodiment of the present invention has significantly enhanced proton conductivity and reduced methanol crossover.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS

Figure 1A:
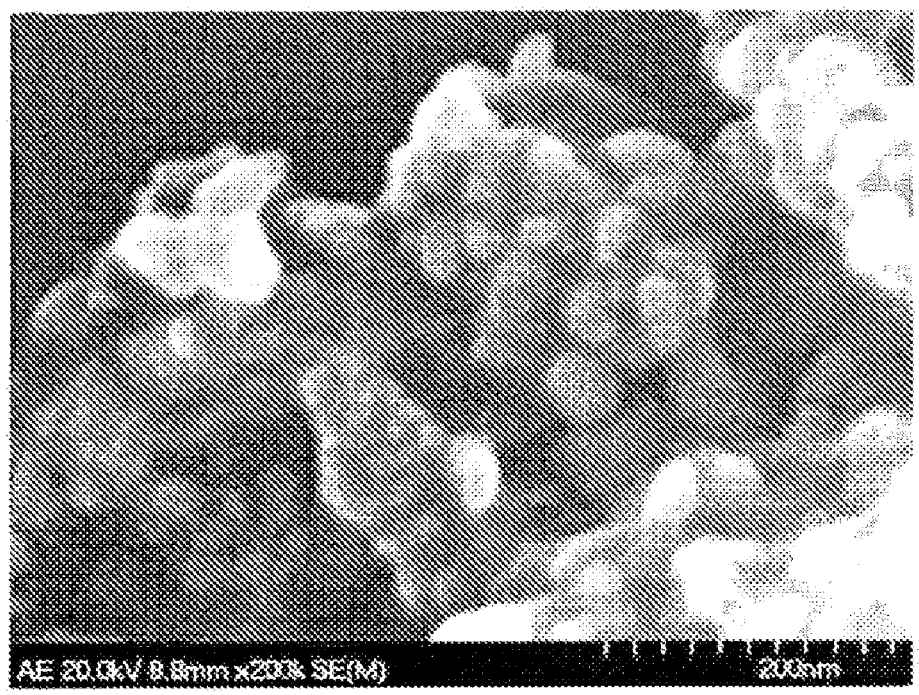
FIGS. 1A through 1C are field emission scanning electron microscopic (FESEM) images of sulfonated $SiO_2$ sol included in a polymer electrolyte membrane according to an embodiment of the present invention.

Hereinafter, the present invention will be described in detail by explaining embodiments of the invention with reference to the attached drawings.

According to an embodiment of the present invention, a polymer electrolyte membrane comprising an inorganic nanoparticle bonded with a proton-conducting group, a solid acid and a proton-conducting polymer is provided.

The solid acid included in the polymer electrolyte membrane is so large that when the solid acid is dispersed in polymer matrixes, leakage of methanol in the polymer electrolyte membrane does not occur since a swelling phenomenon caused by an aqueous methanol solution permeated into the polymer electrolyte membrane does not occur. In addition, an acid functional group such as —OH, —COOH, —$SO_3H$, or —$PO_3H$ attached to the end of the solid acid has high proton conductivity so that the solid acid provides proton conductivity to the polymer electrolyte membrane. Furthermore, inorganic nanoparticles bonded with proton-conducting groups are mixed with the solid acid to form an interpenetrating network with the solid acid, thereby effectively being able to prevent methanol crossover compared with a simple channel blocking structure. That is, the inorganic nanoparticles bonded with proton-conducting groups and the solid acid are mixed together to enhance proton conductivity and also form a more dense membrane. As a result, methanol crossover is reduced.

According to an embodiment of the present invention, the inorganic nanoparticle bonded with the proton-conducting group is obtained by reacting a compound including the proton-conducting group with a metal precursor.

According to an embodiment of the present invention, the metal precursor may be a compound represented by Formula 1 or 2 below.

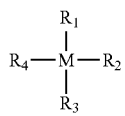

Formula (1)

where M is Si, Ti or Zr,
and $R_1$, $R_2$, $R_3$ and $R_4$ are each independently a $C_1$-$C_{20}$ alkyl group, a $C_6$-$C_{20}$ aryl group, a $C_1$-$C_{20}$ alkoxy group, a $C_7$-$C_{20}$ alkylaryl group, a $C_7$-$C_{20}$ arylalkyl group, a $C_2$-$C_{20}$ alkenyl group, a $C_8$-$C_{20}$ arylalkenyl group, a $C_2$-$C_{20}$ alkynyl group, a hydroxyl group, a nitro group or an amino group, wherein at least one of $R_1$, $R_2$, $R_3$ and $R_4$ may be a $C_1$-$C_{20}$ alkoxy group.

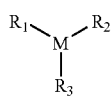

Formula (2)

where M is Al or B,
and $R_1$, $R_2$ and $R_3$ are each independently a $C_1$-$C_{20}$ alkyl group, a $C_6$-$C_{20}$ aryl group, a $C_1$-$C_{20}$ alkoxy group, a $C_7$-$C_{20}$ alkylaryl group, a $C_7$-$C_{20}$ arylalkyl group, a $C_2$-$C_{20}$ alkenyl group, a $C_8$-$C_{20}$ arylalkenyl group, a $C_2$-$C_{20}$ alkynyl group, a hydroxyl group, a nitro group, or an amino group, wherein at least one of $R_1$, $R_2$ and $R_3$ may be a $C_1$-$C_{20}$ alkoxy group.

Examples of the metal precursor include methyltrimethoxysilane, methyl triethoxysilane, methyltripropoxysilane, dimethyl dimethoxy silane, dimethyl diethoxy silane, diethoxy(3-glycidyloxypropyl)methyl silane, diethoxymethylphenyl silane, diethoxymethylvinyl silane, diphenyldiethoxy silane, dimethyldichloro silane, dimethyl ethoxyvinyl silane, ethyltrimethoxy silane, ethyltriethoxy silane, methyltrichloro silane, ethyltrichloro silane, tetraethyl orthosilicate, titanium(IV) methoxide, titanium(IV) ethoxide, titanium(IV) butoxide, titanium(IV) tert-butoxide, titanium(IV) isopropoxide, titanium(IV) propoxide, titanium(IV) chloride, titanium(IV) diisopropoxide bisacetylacetonate, titanium(IV) (triethanolaminato) isopropoxide, aluminium chloride, aluminium isopropoxide, aluminium tributoxide, aluminium tri-sec-butoxide, aluminium triethoxide, borontrichloride and the like.

According to an embodiment of the present invention, the proton-conducting groups in the compound including the proton-conducting groups may be —$SO_3H$, —COOH, —$PO_3H$, —OH, —$OSO_3H$, —$OPO(OH)_3$ or the like. Examples of the compound including the proton-conducting groups include $ClSO_3H$, $ClC_6H_4SO_3H$, $ClC_6H_3(SO_2NH_2)CO_2H$, $ClC_6H_4CO_2H$, $ClSO_2C_6H_4CO_2H$, $ClC_6H_4COCH=CHCO_2H$, $ClC_6H_4COC_6H_4CO_2H$, $ClC_6H_4COCH_2CH_2CO_2H$, $ClC_6H_4CH_2OH$, $ClCF_2CO_2H$, $ClC_6H_2(NO_2)CO_2H$, $ClC_6H_2(F_2)CO_2H$, $ClC_6H_3(F)CO_2H$, $ClC_6H_3(I)CO_2H$, $ClCH_2CH_2PO(OH)_2$, $Cl(CH_2)_4OH$, $Cl(CH_2)_{10}OH$ or the like. In another embodiment, the compound including proton-conducting groups may be $ClSO_3H$.

When the compound including the proton-conducting groups is reacted with the metal precursor, a compound in which a proton-conducting group such as —$SO_3H$ is coordinated with $SiO_2$, $TiO_2$, $ZrO_2$ particles or the like is formed as the resulting compound. Also, a small amount of a compound such as silsesquioxane is formed, or a part of $SiO_2$ forms a network. These resulting products are formed as inorganic nanoparticles.

In the inorganic nanoparticles bonded with the proton-conducting groups that were obtained by reacting the compound with the proton-conducting groups with the metal precursor, the proton-conducting groups enhance the ion conductivity of the polymer electrolyte membrane. In addition, the inorganic nanoparticles bonded with the proton-conducting groups are nano-sized so that the inorganic nanoparticles are thickly placed among solid acids, and the solid acids form an interpenetrating network.

According to an embodiment of the present invention, the solid acid has a main chain having a polymerization of 10-70 and a side chain that is bound to a repeating unit of the main chain and represented by Formula 3 below.

Formula (3)

where each $E_i$ included in $E_1$ through $E_{n-1}$ is independently any one of the organic groups represented by Formulae 4 through 8 below,

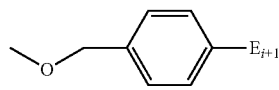

Formula (4)

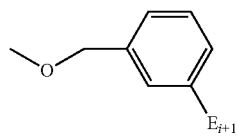

Formula (5)

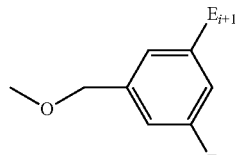

Formula (6)

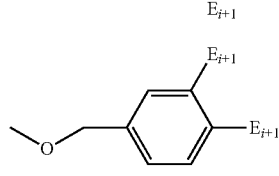

Formula (7)

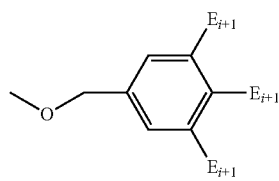

Formula (8)

each $E_{i+1}$ in Formulae 6 through 8 may be independently the same or different, the number of $E_{i+1}$ of the $(i+1)^{th}$ generation bonded with $E_i$ of the $i^{th}$ generation is the same as the number of available bonds existing in $E_i$, n refers to the generation of the branch unit and is an integer in the range of 2-4, $E_n$ is any one of —$SO_3H$, —COOH, —OH, and —OPO(OH)$_3$.

The main chain of the solid acid may have a polymerization of 10-70, preferably, 20-50. When the polymerization of the main chain of the solid acid is less than 10, there is a high possibility that a total molecular weight of the main chain and the side chain does not reach 10,000. In that case, the molecular size of the solid acid is not sufficiently big, and thus the solid acid will outflow from the polymer electrolyte membrane. On the other hand, when the polymerization of the main chain of the solid acid is greater than 70, there is a high possibility that a total molecular weight of the main chain and the side chain exceeds 40,000. In that case, physical properties of the solid acid can't be controlled, and the solid acid formed by phase separation from matrixes in the polymer electrolyte membrane can have a significantly large domain size.

The repeating unit of the main chain of the solid acid may be a repeating unit of styrene, ethylene, imides, amides, acrylates, amic esters or aniline.

In particular, the repeating unit of the main chain of the solid acid may be any one of the compounds represented by Formulae 9 through 11 below, but is not limited thereto:

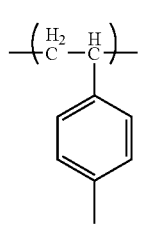

Formula (9)

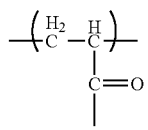

Formula (10)

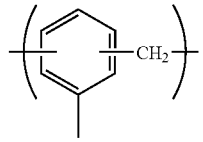

Formula (11)

The side chain that is bound to the repeating unit of the main chain of the solid acid may be any one of the compounds represented by Formulae 12 through 17 below, but is not limited thereto:

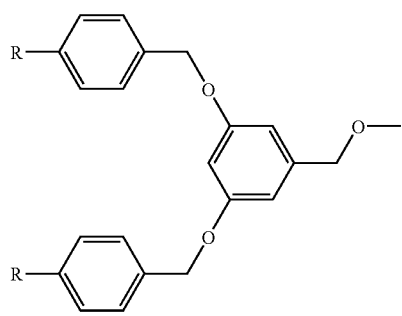

Formula (12)

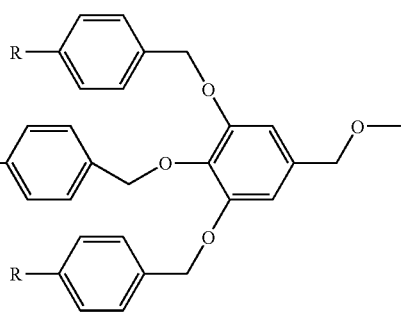

Formula (13)

-continued
Formula (14)
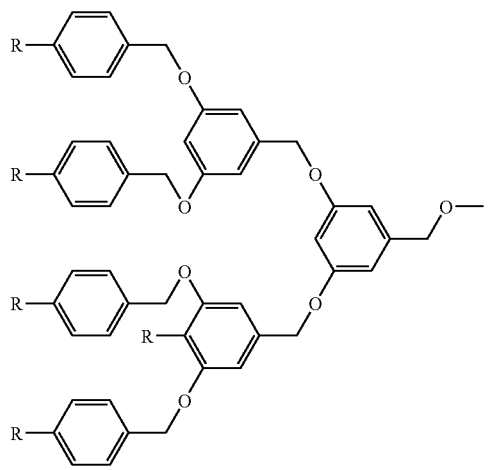
Formula (15)
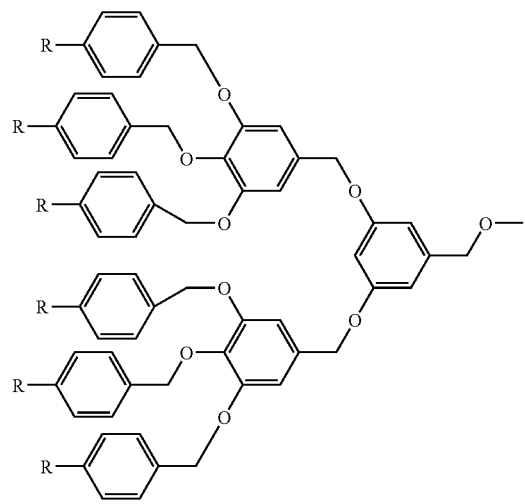
Formula (16)
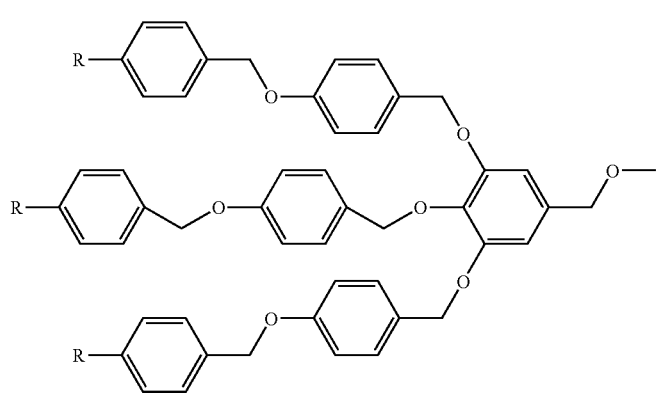
Formula (17)
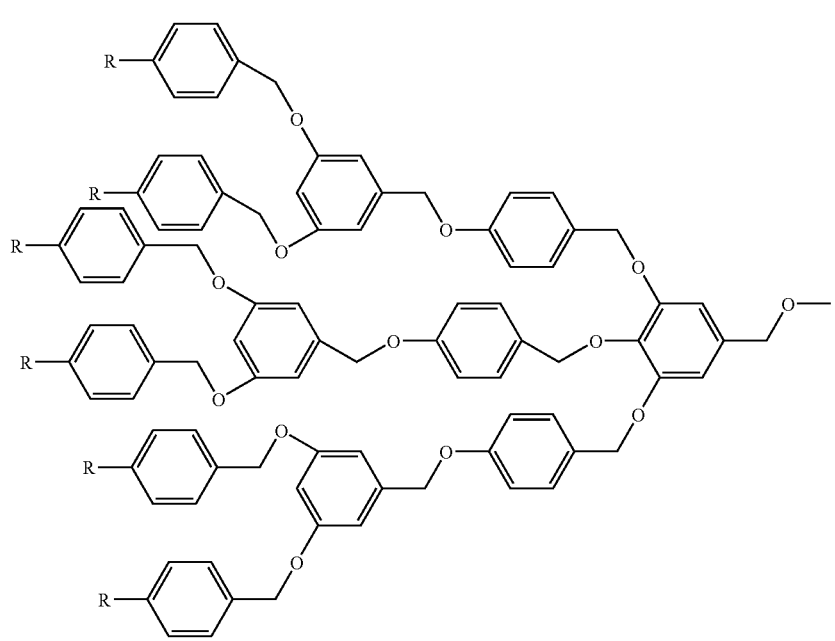

where R is any one of —SO$_3$H, —COOH, —OH, and —OPO(OH)$_3$.

Any of the solid acids disclosed in Korean Patent No. 2005-0094935, filed by the applicant of the present application, the entire content of which is incorporated by reference herein, can be used as the solid acid in the polymer electrolyte membrane according to the present invention.

The solid acid may have a molecular weight of 10,000-40,000. When the molecular weight of the solid acid is less than 10,000, the molecular size of the solid acid is not sufficiently big, and thus the solid acid will outflow from the polymer electrolyte membrane. When the molecular weight of the solid acid is greater than 40,000, physical properties of the solid acid can't be controlled, and the solid acid formed by phase separation from matrixes in the polymer electrolyte membrane can have a significantly large domain size.

The present invention will be now described in more detail by describing a method of preparing a representative solid acid used in the present invention. The method described below is for illustrative purposes only and is not intended to limit the scope of the present invention.

First, a unit of the side chain of the solid acid can be synthesized as shown in Reaction Scheme 1 below:

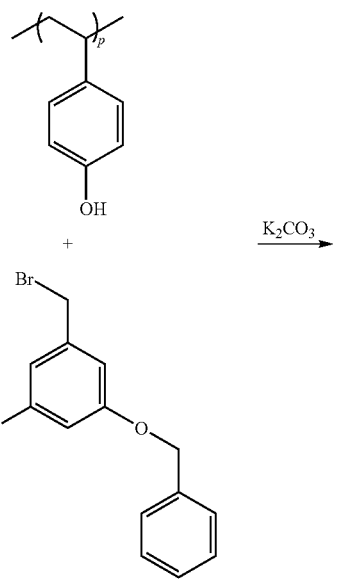

Reaction Scheme (1)

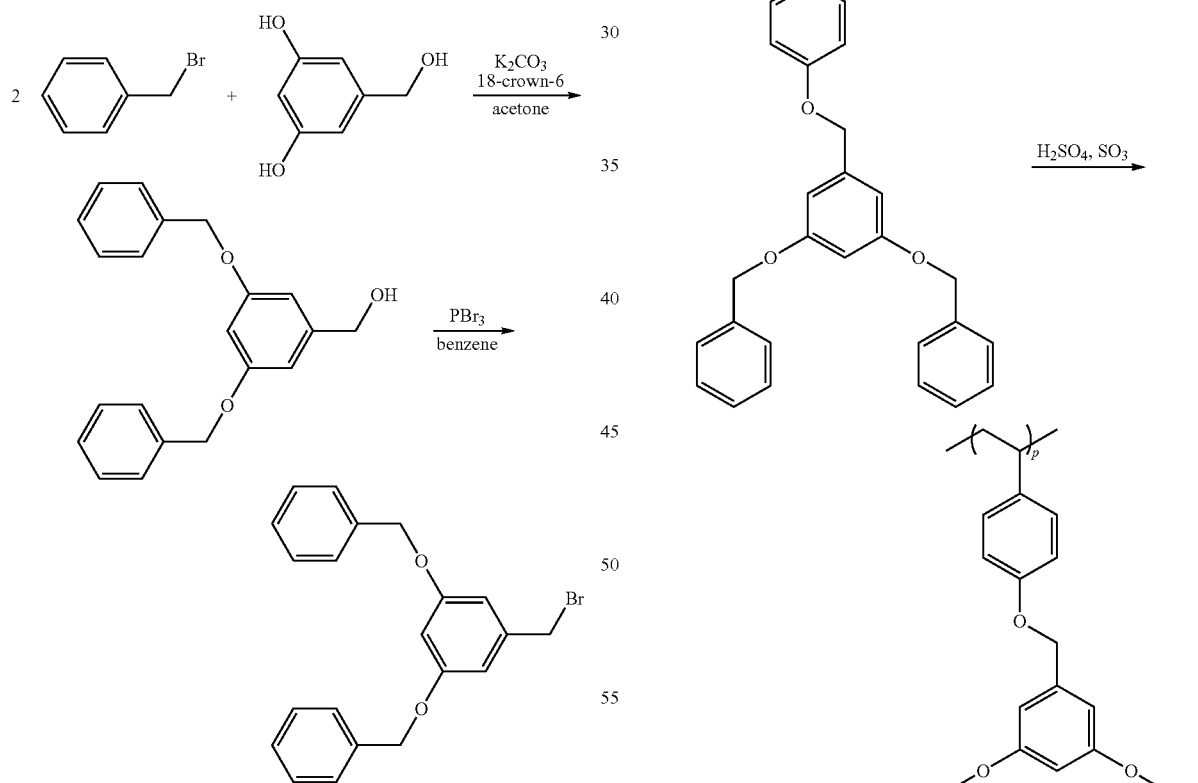

The unit of the side chain of the solid acid can have several generations by repeatedly performing the processes shown in Reaction Formula 1.

Thereafter, the unit of the side chain of the solid acid is reacted with a compound of the main chain of the solid acid as shown in Reaction Scheme 2 to prepare the solid acid according to an embodiment of the present invention:

where p refers to an integer that determines a molecular weight of the compound of the main chain of the solid acid to be in the range of 2,000-8,000.

In order to have a functional group such as —COOH, —OH, or —OPO(OH)$_3$ at the terminal of the solid acid, a structure in which the functional group such as —COOH, —OH, or —OPO(OH)$_3$ is protected by an alkyl group during the branching structure synthesis. That is, the functional group is included in a benzyl halide compound having a structure of —COOR, —OR, or —OPO(OR)$_3$. Then, the polymer with the low molecular weight is prepared and the oligomer acid can be subsequently manufactured by detaching an alkyl group. Here, R is, for example, a monovalent $C_1$-$C_5$ alkyl group.

According to an embodiment of the present invention, the proton-conducting polymer may be at least one selected from the group consisting of polyimides, polyalkylethers, polyetheretherketone, polyethersulfone, NAFION, polyvinylalcohols and copolymers thereof.

The polymer electrolyte membrane according to an embodiment of the present invention includes 1-90 parts by weight of the inorganic nanoparticle bonded with the proton-conducting group and 0.1-50 parts by weight of the solid acid, based on 100 parts by weight of the proton-conducting polymer.

When the amount of the inorganic nanoparticles bonded with proton-conducting groups is less than 1 part by weight based on 100 parts by weight of the proton-conducting polymer, proton conductivity is not enhanced and methanol crossover cannot be prevented. When the amount of the inorganic nanoparticle bonded with proton-conducting groups is greater than 90 parts by weight based on 100 parts by weight of the proton-conducting polymer, the polymer electrolyte membrane may be cracked.

When the amount of the solid acid is less than 0.1 parts by weight based on 100 parts by weight of the proton-conducting polymer, the effect of the solid acid is very small. When the amount of the solid acid is greater than 50 parts by weight based on 100 parts by weight of the proton-conducting polymer, the solid acid can outflow from the polymer electrolyte membrane.

One embodiment of the present invention also provides a fuel cell with a membrane-electrode assembly including a cathode having a catalyst layer and a diffusion layer; an anode having a catalyst layer and a diffusion layer; and an electrolyte membrane interposed between the cathode and the anode, wherein the electrolyte membrane may be the polymer electrolyte membrane according to an embodiment of the present invention. In particular, the fuel cell according to an embodiment of the present invention may be a direct methanol fuel cell (DMFC) or a polymer electrolyte membrane fuel cell (PEMFC).

Figure 3:
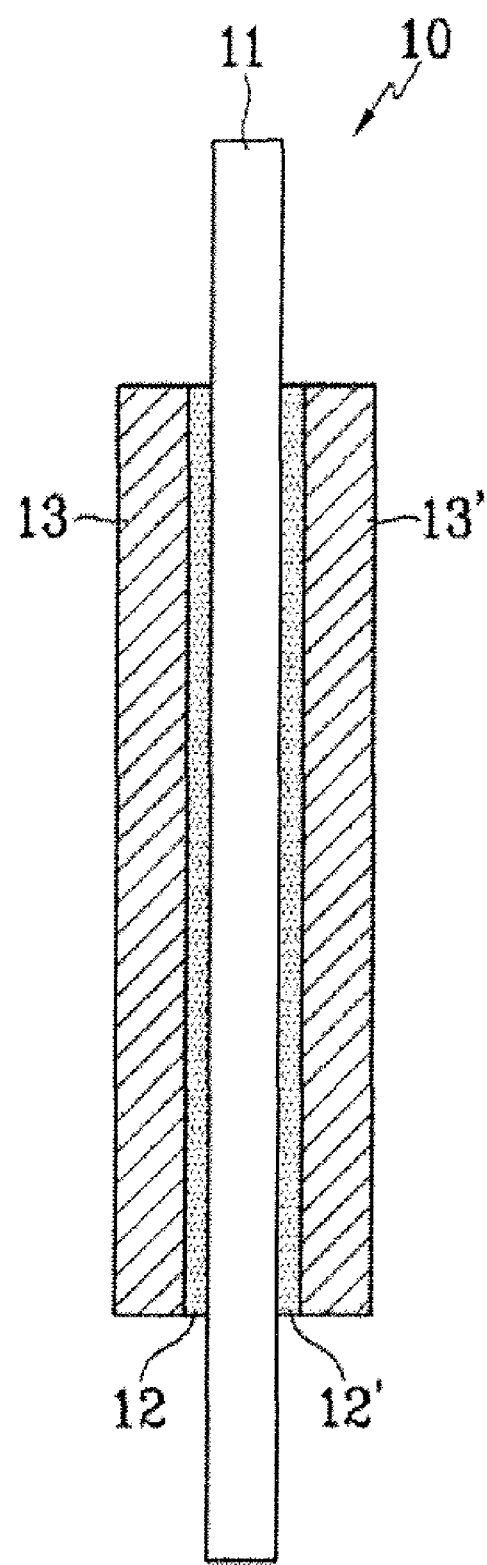
FIG. 3 is a cross-sectional view of a fuel cell membrane-electrode assembly according to an embodiment of the present invention.

In one embodiment, referring to FIG. 3, the membrane-electrode assembly 10 includes a polymer electrolyte membrane 11, catalyst layers 12, 12' on both surfaces of the polymer electrolyte membrane 11, and gas diffusion layers 13, 13' disposed on the outside surfaces of the catalyst layers 12, 12'.

The cathode and anode each having a catalyst layer and a diffusion layer are widely known in the prior art. In addition, the electrolyte membrane includes the polymer electrolyte membrane according to an embodiment of the present invention. The polymer electrolyte membrane can be used alone as the electrolyte membrane, or can be combined with other membranes having ion conductivity.

Such a fuel cell can be manufactured using conventional methods, and thus a detailed description of the method of manufacturing the fuel cell using a polymer electrolyte membrane according to an embodiment of the present invention will be omitted.

In addition, the present invention also provides a method of preparing a polymer electrolyte membrane, the method including:

adding a compound including a proton-conducting group to a compound represented by Formula 1 or 2 below and stirring the mixture, and then adding water to the resultant to prepare an inorganic nanoparticle bonded with a proton-conducting group in a sol-type form;

supplying a composition for preparing a polymer electrolyte membrane including the inorganic nanoparticle bonded with a proton-conducting group in a sol-type form, a proton-conducting polymer, a solid acid and a solvent;

applying the composition for preparing the polymer electrolyte membrane; and drying the applied composition for preparing the polymer electrolyte membrane.

Formula (1)

where M is Si, Ti or Zr,
and $R_1$, $R_2$, $R_3$ and $R_4$ are each independently a $C_1$-$C_{20}$ alkyl group, a $C_6$-$C_{20}$ aryl group, a $C_1$-$C_{20}$ alkoxy group, a $C_7$-$C_{20}$ alkylaryl group, a $C_7$-$C_{20}$ arylalkyl group, a $C_2$-$C_{20}$ alkenyl group, a $C_8$-$C_{20}$ arylalkenyl group, a $C_2$-$C_{20}$ alkynyl group, a hydroxyl group, a nitro group or an amino group, wherein at least one of $R_1$, $R_2$, $R_3$ and $R_4$ may be a $C_1$-$C_{20}$ alkoxy group.

Formula (2)

where M is Al or B,
and $R_1$, $R_2$ and $R_3$ are each independently a $C_1$-$C_{20}$ alkyl group, a $C_6$-$C_{20}$ aryl group, a $C_1$-$C_{20}$ alkoxy group, a $C_7$-$C_{20}$ alkylaryl group, a $C_7$-$C_{20}$ arylalkyl group, a $C_2$-$C_{20}$ alkenyl group, a $C_8$-$C_{20}$ arylalkenyl group, a $C_2$-$C_{20}$ alkynyl group, a hydroxyl group, a nitro group, or an amino group, wherein at least one of $R_1$, $R_2$ and $R_3$ may be a $C_1$-$C_{20}$ alkoxy group.

In one embodiment, the compound including proton-conducting groups may be $ClSO_3H$.

In an embodiment, the solvent may be at least one selected from the group consisting of N-methyl-2-pyrrolidone, dimethylformamide, methylsulfoxide, dimethylsulfoxide, N,N'-dimethylacetamide and mixtures thereof.

The method of preparing the polymer electrolyte membrane according to an embodiment of the present invention will now be described in more detail with reference to a nonrestrictive example.

To prepare the sulfonated nanoparticles in a sol-type form, first, chlorosulfonic acid is added to methyl trimethoxy silane. The mixture is fully stirred overnight. Then, a solvent such as dimethylformamide (DMF) is added to the stirred mixture and stirred for 2-3 hours. Examples of the solvent include N-methyl-2-pyrrolidone, N,N'-dimethylacetamide, methylsulfoxide, dimethylsulfoxide or the like besides dimethylformamide, but are not limited thereto. Thereafter, water is added to the resulting product to finally synthesize the sulfonated inorganic nanoparticles in a sol-type form to be used for preparing a polymer electrolyte membrane. At this time, the amount of the sulfonated inorganic nanoparticles in a sol-type form may be about 1-80 weight %, preferably about 5-40 weight %.

The sulfonated inorganic nanoparticles in a sol-type form prepared as above are mixed with a proton-conducting polymer, a solid acid, and a solvent to prepare a composition for preparing a polymer electrolyte membrane. The solvent may be N-methyl-2-pyrrolidone, N,N'-dimethylacetamide, dimethylformamide, methylsulfoxide, dimethylsulfoxide or the like, but is not limited thereto. A mixture of at least two compounds described above can be used as the solvent. The amount of the solvent may be 1-99 weight % based on the composition for preparing a polymer electrolyte membrane. When the amount of the solvent is less than 1 weight % based on the composition for preparing a polymer electrolyte membrane, the composition for preparing a polymer electrolyte membrane can have a reduced coating property, viscosity or the like. When the amount of the solvent is greater than 99 weight % based on the composition for preparing a polymer electrolyte membrane, the amount of the solid portion in the compound is too small.

The composition for preparing a polymer electrolyte membrane is applied on a substrate. Here, the application method is not particularly limited, and various known methods such as spin coating, bar coating and the like can be used.

Subsequently, the applied composition for preparing a polymer electrolyte membrane is heat-treated.

In one embodiment, the heat treatment is a hard-baking process performed at 120-250° C. When the temperature of the heat treatment is less than 120° C., the polymer electrolyte membrane can't be satisfactorily cured. When the temperature of the heat treatment is greater than 250° C., a sulfonic acid group contained in the polymer electrolyte membrane itself is decomposed. The heat treatment time varies according to the temperature of the heat treatment, and is preferably 5 minutes through 24 hours.

In the method of preparing the polymer electrolyte membrane according to one embodiment of the present invention, a pre-heat treatment process can be further performed prior to the hard-baking process described above. Here, the pre-heat treatment process is a process in which a portion of the solvent is removed from the resulting product applied with the composition for preparing a polymer electrolyte membrane, and is a soft baking process performed at 60-110° C. When the temperature of the pre-heat treatment is less than 60° C., it takes too much time to remove the solvent. When the temperature of the pre-heat treatment is greater than 110° C., the solvent is so rapidly removed that film uniformity cannot be achieved.

The pre-heat treatment time varies according to the temperature of the heat treatment, and in one embodiment is 5 minutes through 4 hours.

The polymer electrolyte membrane prepared using the above processes can be used as an electrolyte membrane of a fuel cell according to an embodiment of the present invention.

The polymer electrolyte membrane according to an embodiment of the present invention may have a thickness of 5-200 μm. When the thickness of the polymer electrolyte membrane is less than 5 μm, the polymer electrolyte membrane is too thin, and thereby is susceptible to being torn. When the thickness of the polymer electrolyte membrane is greater than 200 μm, the polymer electrolyte membrane can be cracked.

Hereinafter, the present invention will be described in further detail with reference to the following examples and comparative examples. These examples are for illustrative purposes only and are not intended to limit the scope of the present invention.

EXAMPLES

Preparation Example 1

Synthesis of Sulfonated $SiO_2$ sol 4 g of methyl trimethoxy silane as a metal precursor was mixed with 1 g of chlorosulfonic acid. The mixture was stirred at 50° C. overnight. 150 ml of DMF was added to the stirred mixture, and stirred for three hours. Then, 2.6 ml of water was added to the resulting product to prepare a sulfonated $SiO_2$ sol.

Preparation Example 2

Synthesis of Sulfonated $TiO_2$ sol

A sulfonated $TiO_2$ sol was prepared according to Preparation Example 1, except that 4 g of titanium ethoxide as a metal precursor was mixed with 1.4 g of chlorosulfonic acid. Here, the amount of $TiO_2$ particles was about 10 weight % based on a solvent in the $TiO_2$ sol.

Preparation Example 3

Synthesis of Solid Acid 0.38 mole of benzylbromide and 0.18 mole of 3,5-dihydroxybenzylalcohol were dissolved in acetone with 0.36 mole of $K_2CO_3$ and 0.036 mole of 18-crown-6, and refluxed for 24 hours. The mixture was cooled to room temperature, and then tetrahydrofuran (THF) was removed by distillation. Then the resulting product was extracted using an ethylacetate/sodium hydroxide solution, and separated. The separated organic layer was dried using $MgSO_4$, and a solvent was removed by distillation. The resultant was purified by recrystallization with ether/hexane. As a result, 37 g of a compound represented by Formula 18 below was obtained as a white crystalline solid (yield: 67%).

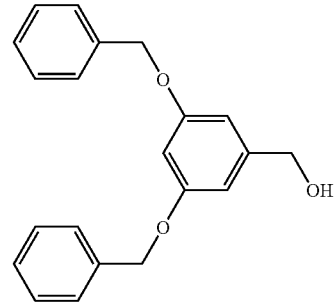

Formula (18)

20 g (0.065 mole) of the compound of Formula 18 was dissolved in 50 ml of benzene at 0° C., a solution obtained by dissolving 6.4 g (0.0238 mole) of $PBr_3$ in benzene was added drop to drop to the above solution, and then the mixture was stirred for 15 minutes. Then, the temperature of the stirred mixture was raised to room temperature and stirred for 2 hours. The mixture was placed in an ice-bath and benzene was removed by distillation. Thereafter, an aqueous phase was extracted with ethylacetate, a separated organic layer was dried using MgSO$_4$, and then the solvent was removed by distillation. The resulting product was purified by recrystallization with toluene/ethanol. As a result, 19 g of a compound represented by Formula 19 below was obtained as a white crystalline solid (yield: 79%).

Formula (19)

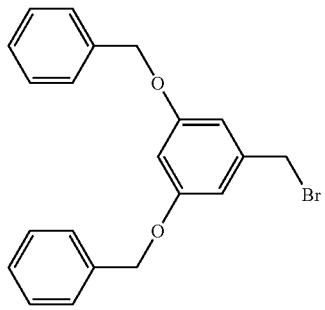

8.4 g of the compound of Formula 19 synthesized as above and 2.42 g of commercially available polyhydroxystyrene (PHSt: a compound represented by Formula 20 below, Mw=3000, product manufactured by Nippon Soda, Japan) were dissolved in 200 ml of tetrahydrofuran (THF) with 2.8 g of K$_2$CO$_3$ and 1.1 g of 18-crown-6, and the mixture was refluxed for 24 hours. Then, the mixture was cooled to room temperature, acetone was removed by distillation, and the resulting product was separated by extraction using a toluene/sodium hydroxide solution. The separated toluene layer was dried using MgSO$_4$, and toluene was distilled. As a result, the toluene layer was concentrated to a volume of 50 mL. The resulting product was precipitated in ethanol to obtain 8.2 g of a compound represented by Formula 21 below as a white crystalline solid (yield: 76%).

Formula (20)

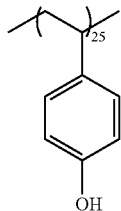

Formula (21)

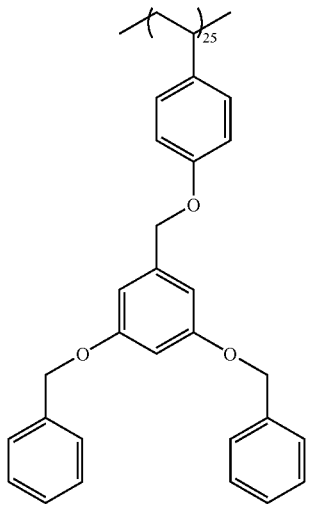

5 g of the compound of Formula 21 prepared as above (solid acid precursor) was completely dissolved in 15 ml of sulfuric acid. Then, 5 ml of fuming sulfuric acid (SO$_3$ 60%) was added to the resulting product, and they were allowed to react at 80° C. for 12 hours and then precipitated in ether. The precipitated resulting product was filtered, and then dissolved in water. Then, the resulting product was placed in a dialysis membrane to be purified, and a compound represented by Formula 22 below was obtained.

Formula (22)

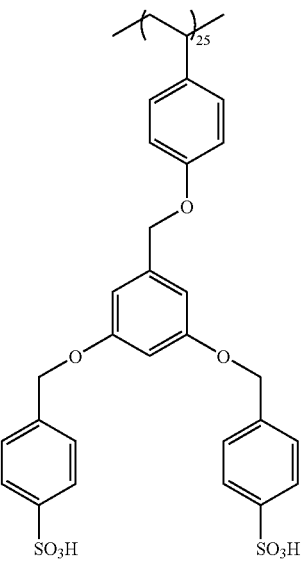

where the weight average molecular weight of the compound of Formula 22 is 14,600.

Comparative Example 1

12.5 weight % of SPEEK prepared by sulfonizing PEEK for 120 hours was mixed with 87.5 weight % of dimethyl formamide as a solvent to make a composition for preparing a polymer electrolyte membrane. The composition for preparing a polymer electrolyte membrane was spin-coated on a substrate, and the resulting product was pre-heat treated at 90° C. for about 10 minutes.

Subsequently, the resultant was heat-treated in a nitrogen atmosphere at about 150° C. for about 2 hours to prepare a polymer electrolyte membrane having a thickness of about 34 μm. Then, the prepared polymer electrolyte membrane was immersed in 2 M of a diluted aqueous sulfuric acid solution, and protonation was performed at 80° C. for 2 hours. Thereafter, a film was taken out and washed with deionized distilled water several times to prepare an electrolyte membrane.

Comparative Example 2

A polymer electrolyte membrane was prepared according to Comparative Example 1, except that SPEEK and the solid acid prepared in Preparation Example 3 were mixed together in a weight ratio of 5:1, and a composition for preparing a polymer electrolyte membrane was prepared using dimethyl formamide.

Comparative Example 3

A NAFION (manufactured by DuPont) membrane, which is commercially available, was prepared. Then, a polymer electrolyte membrane was prepared according to Comparative Example 1.

Comparative Example 4

A polymer electrolyte membrane having a thickness of about 22 μm was prepared according to Comparative Example 1, except that sulfonated polyetheretherketone (SPEEK) and sulfonated $SiO_2$ sol synthesized by Preparation Example 1 were mixed together in a weight ratio of 2:1 (8 weight %:4 weight %) to prepare a composition for preparing a polymer electrolyte membrane. At this time, 88 weight % of dimethyl formamide was used as solvent based on 100 weight % of SPEEK.

Comparative Example 5

A polymer electrolyte membrane having a thickness of about 14 μm was prepared according to Comparative Example 1, except that SPEEK and sulfonated $SiO_2$ sol prepared in Preparation Example 1 were mixed together in a weight ratio of 1:1 (6 weight %:6 weight %), and 88 weight % of dimethyl formamide was used as solvent to prepare a composition for preparing a polymer electrolyte membrane.

Comparative Example 6

A polymer electrolyte membrane having a thickness of about 10 μm was prepared according to Comparative Example 1, except that SPEEK and sulfonated $SiO_2$ sol prepared in Preparation Example 1 were mixed together in a weight ratio of 4:7 (4 weight %:7 weight %), and 89 weight % of dimethyl formamide was used as solvent to prepare a composition for preparing a polymer electrolyte membrane.

Comparative Example 7

A polymer electrolyte membrane having a thickness of about 10 μm was prepared according to Comparative Example 1, except that SPEEK and sulfonated $TiO_2$ sol prepared in Preparation Example 2 were mixed together in a weight ratio of 2:1 (8 weight %:4 weight %), and 88 weight % of dimethyl formamide was used as solvent to prepare a composition for preparing a polymer electrolyte membrane.

Comparative Example 8

A polymer electrolyte membrane having a thickness of about 43 μm was prepared according to Comparative Example 1, except that SPEEK and sulfonated $TiO_2$ sol prepared in Preparation Example 2 were mixed together in a weight ratio of 1:1 (6 weight %:6 weight %), and 88 weight % of dimethyl formamide was used as a solvent to prepare a composition for preparing a polymer electrolyte membrane.

Example 1

A polymer electrolyte membrane having a thickness of about 17 μm was prepared according to Comparative Example 1, except that SPEEK, sulfonated $SiO_2$ sol prepared in Preparation Example 1 and solid acid prepared by Preparation Example 3 were mixed together in a weight ratio of 8:4:1 (8 weight %:4 weight %:1 weight %), and 87 weight % of dimethyl formamide was used as solvent to prepare a composition for preparing a polymer electrolyte membrane.

Example 2

A polymer electrolyte membrane having a thickness of about 62 μm was prepared according to Comparative Example 1, except that SPEEK, sulfonated $TiO_2$ sol prepared in Preparation Example 2 and solid acid prepared in Preparation Example 3 were mixed together in a weight ratio of 6:6:1 (6 weight %:6 weight %:1 weight %), and 87 weight % of dimethyl formamide was used as solvent to prepare a composition for preparing a polymer electrolyte membrane.

Figure 1B:
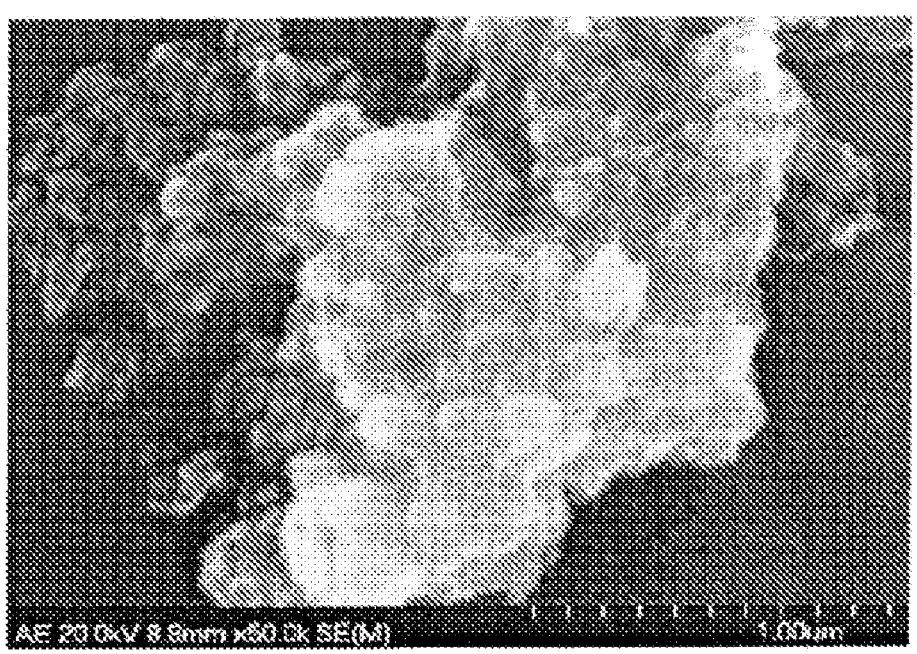
Figure 1C:
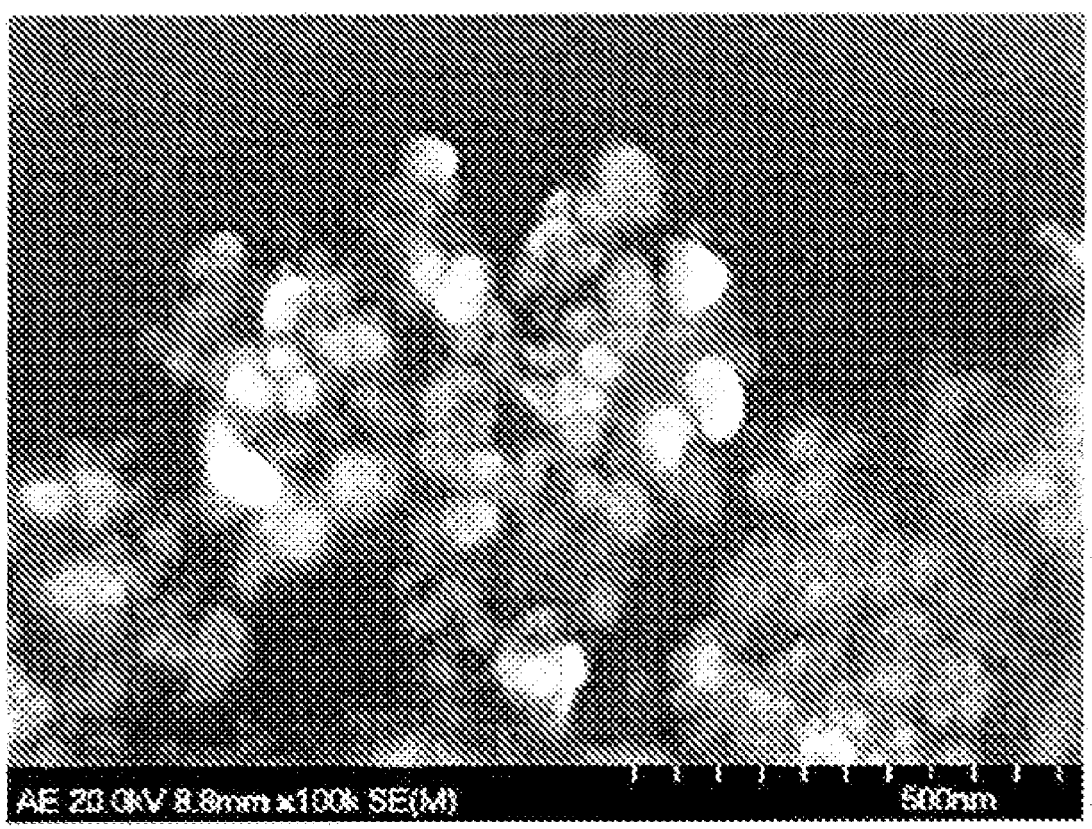
Figure 2A:
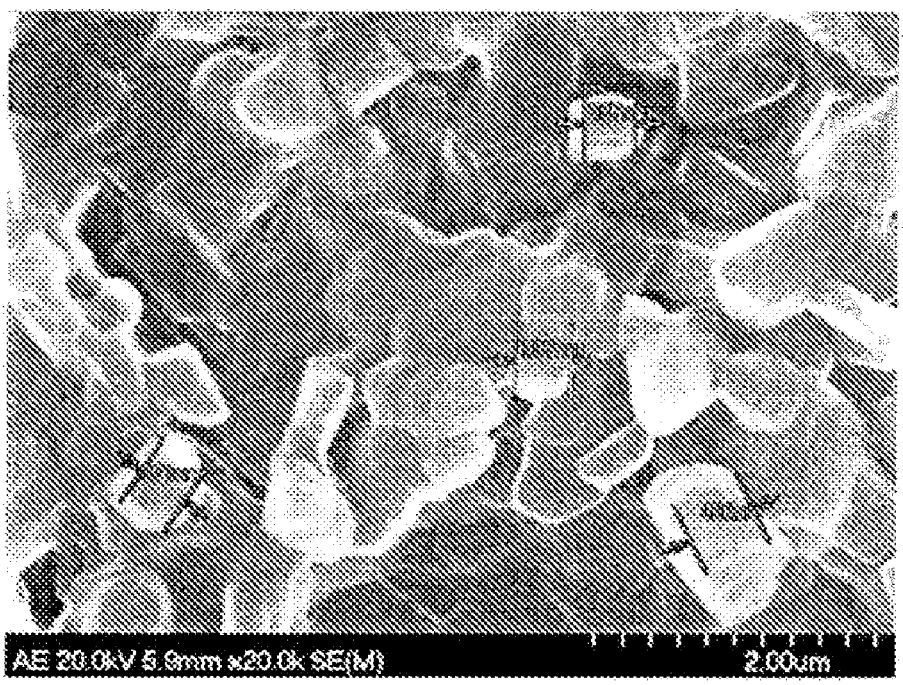
FIGS. 2A and 2B are FESEM images of sulfonated $TiO_2$ sol included in a polymer electrolyte membrane according to another embodiment of the present invention.
Figure 2B:
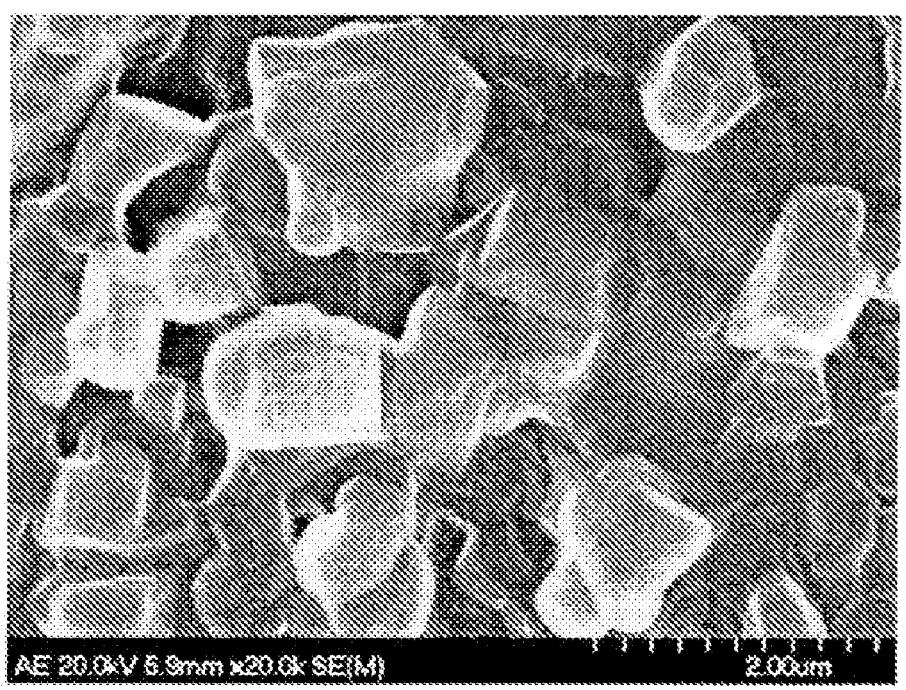

FIGS. 1A through 1C are field emission scanning electron microscopic (FESEM) images of sulfonated $SiO_2$ sol prepared in Preparation Example 1. Also, FIGS. 2A and 2B are FESEM images of sulfonated $TiO_2$ sol prepared in Preparation Example 2. In the sol compositions prepared in Preparation Examples 1 and 2, solvent was volatilized and then FESEM images were taken. Although it was expected that since special treatment for preventing particles from being agglomerated was not performed, the particles prepared in Preparation Examples 1 and 2 would be agglomerated and thus shown to have a greater diameter in the FESEM images of FIGS. 1A through 1C and 2A and 2B, it was confirmed that all the sol compositions were formed as nanoparticles.

Proton conductivity and methanol crossover of the polymer electrolyte membranes of Examples 1 and 2 and Comparative Examples 1 through 8 were measured. The results are shown in Table 1 below.

TABLE 1

| Membrane composition | proton conductivity (S/cm) | methanol crossover ($cm^2$/sec) |
|---|---|---|
| Comparative Example 1 | $7.42 \times 10^{-2}$ | $7.74 \times 10^{-7}$ |
| Comparative Example 2 | $1 \times 10^{-2}$ | $4.63 \times 10^{-7}$ |
| Comparative Example 3 | $1.24 \times 10^{-1}$ | $2.4 \times 10^{-6}$ |
| Comparative Example 4 | $1.28 \times 10^{-1}$ | $2.84 \times 10^{-8}$ |
| Comparative Example 5 | $5.97 \times 10^{-2}$ | $6.32 \times 10^{-7}$ |
| Comparative Example 6 | $1.21 \times 10^{-1}$ | $3.87 \times 10^{-7}$ |
| Comparative Example 7 | $1.31 \times 10^{-1}$ | $6.45 \times 10^{-8}$ |
| Comparative Example 8 | $8.06 \times 10^{-2}$ | $8.32 \times 10^{-8}$ |
| Example 1 | $2.11 \times 10^{-1}$ | $1.1 \times 10^{-7}$ |
| Example 2 | $2.98 \times 10^{-1}$ | $4.0 \times 10^{-8}$ |

The polymer electrolyte membrane of Comparative Example 1 includes only SPEEK, the polymer electrolyte membrane of Comparative Example 2 includes SPEEK and solid acid, and the polymer electrolyte membrane of Comparative Example 3 includes a NAFION membrane. Referring to Table 1, the polymer electrolyte membranes of Comparative Examples 4 through 6 obtained by mixing sulfonated $SiO_2$ sol, which are used as nanoparticles bonded with proton-conducting groups, and SPEEK in a different ratio, respectively, have higher proton conductivity than that of the polymer electrolyte membranes of Comparative Examples 1 through 3. In particular, the polymer electrolyte membranes of Comparative Examples 4 and 6 have higher proton conductivity than that of the NAFION membrane of Comparative Example 3. Accordingly, it can be seen that the polymer electrolyte membrane can have enhanced proton conductivity by adding inorganic nanoparticles bonded with proton-conducting groups thereto.

In the case of the polymer electrolyte membrane of Example 1, which includes both sulfonated $SiO_2$ sol and solid acid, proton conductivity is much higher than that of the polymer electrolyte membranes of Comparative Examples 1 through 6. That is, proton conductivity of the polymer electrolyte membrane of Example 1 is higher than that of the polymer electrolyte membrane of Comparative Example 2, which includes only solid acid, and that of the polymer electrolyte membranes of Comparative Examples 4 through 6, which includes only sulfonated $SiO_2$ sol. From the results, it can be seen that when the polymer electrolyte membrane includes both sulfonated $SiO_2$ sol and solid acid, proton conductivity thereof can be significantly enhanced. On the other hand, Example 1 shows a much lower value of methanol crossover than that of methanol crossover in Comparative Examples 1 through 6 except Comparative Example 4. Thus, it can be seen that the polymer electrolyte membrane of Example 1 has reduced methanol crossover.

The polymer electrolyte membranes of Comparative Examples 7 and 8 are prepared by mixing sulfonated $TiO_2$ sol, which are nanoparticles bonded with proton-conducting groups, and SPEEK in a different ratio, respectively. In the case of the polymer electrolyte membrane of Example 2, which includes both sulfonated $TiO_2$ sol and solid acid, proton conductivity is much higher than that of the polymer electrolyte membranes of Comparative Examples 1 through 6. In Example 2, it can be seen that when the polymer electrolyte membrane includes both sulfonated $TiO_2$ sol and solid acid, proton conductivity thereof can be significantly enhanced, which is the same as in Example 1. On the other hand, Example 2 has the lowest methanol crossover compared with that of Comparative Examples 1 through 3 and 7 and 8. Thus, it can be seen that the polymer electrolyte membrane of Example 2 has reduced methanol crossover.

Exemplary embodiments of the polymer electrolyte membrane according to the present invention have significantly enhanced proton conductivity and reduced methanol crossover.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A polymer electrolyte membrane comprising:
   a plurality of inorganic nanoparticles, each of the inorganic nanoparticles being bonded with at least one proton-conducting group;
   a polymeric solid acid; and
   a proton-conducting polymer.

2. The polymer electrolyte membrane of claim 1, wherein each inorganic nanoparticle bonded with the at least one proton-conducting group is obtained by reacting a compound comprising the proton-conducting group with a metal precursor.

3. The polymer electrolyte membrane of claim 2, wherein the metal precursor is a compound represented by Formula 1 or 2 below:

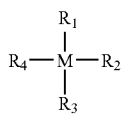

Formula (1)

where M is Si, Ti or Zr,
and $R_1$, $R_2$, $R_3$ and $R_4$ are each independently a $C_1$-$C_{20}$ alkyl group, a $C_6$-$C_{20}$ aryl group, a $C_1$-$C_{20}$ alkoxy group, a $C_7$-$C_{20}$ alkylaryl group, a $C_7$-$C_{20}$ arylalkyl group, a $C_2$-$C_{20}$ alkenyl group, a $C_8$-$C_{20}$ arylalkenyl group, a $C_2$-$C_{20}$ alkynyl group, a hydroxyl group, a nitro group or an amino group, wherein at least one of $R_1$, $R_2$, $R_3$ and $R_4$ is a $C_1$-$C_{20}$ alkoxy group; and

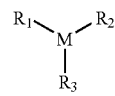

Formula (2)

where M is Al or B,
and $R_1$, $R_2$ and $R_3$ are each independently a $C_1$-$C_{20}$ alkyl group, a $C_6$-$C_{20}$ aryl group, a $C_1$-$C_{20}$ alkoxy group, a $C_7$-$C_{20}$ alkylaryl group, a $C_7$-$C_{20}$ arylalkyl group, a $C_2$-$C_{20}$ alkenyl group, a $C_8$-$C_{20}$ arylalkenyl group, a $C_2$-$C_{20}$ alkynyl group, a hydroxyl group, a nitro group, or an amino group, wherein at least one of $R_1$, $R_2$ and $R_3$ is a $C_1$-$C_{20}$ alkoxy group.

4. The polymer electrolyte membrane of claim 2, wherein the proton-conducting group in the compound comprising the proton-conducting group is one selected from the group consisting of $-SO_3H$, $-COOH$, $-PO_3H$, $-OH$, $-OSO_3H$, and $-OPO(OH)_3$.

5. The polymer electrolyte membrane of claim 2, wherein the proton-conducting group of the compound comprising the proton-conducting group is $-SO_3H$.

6. The polymer electrolyte membrane of claim 1, wherein the polymeric solid acid has a main chain having a polymerization of 10-70 and a side chain that is bound to a repeating unit of the main chain and represented by Formula 3 below:

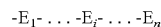

Formula (3)

where each $E_i$ included in $E_1$ through $E_{n-1}$ is independently any one of the organic groups represented by Formulae 4 through 8 below;

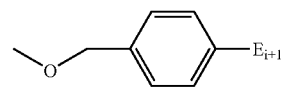

Formula (4)

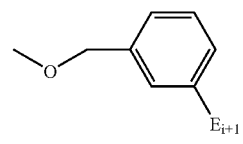

Formula (5)

Formula (6)

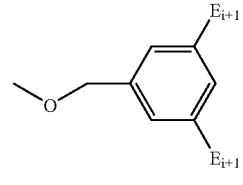

Formula (7)

Formula (8)

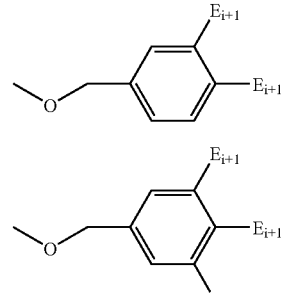

each $E_{i+1}$ in Formulae 6 through 8 is independently the same or different;

the number of $E_{i+1}$ of the $(i+1)^{th}$ generation bonded with $E_i$ of the generation is the same as the number of available bonds existing in $E_i$;

n refers to the generation of a branch unit and is an integer in the range of 2-4; and $E_n$ is any one of —SO₃H, —COOH, —OH, or —OPO(OH)₃.

7. The polymer electrolyte membrane of claim 6, wherein the repeating unit of the main chain of the polymeric solid acid is a repeating unit of styrene, ethylene, imides, amides, acrylates, amic esters or aniline.

8. The polymer electrolyte membrane of claim 6, wherein the side chain of the polymeric solid acid is any one of the compounds represented by Formulae 12 through 17 below:

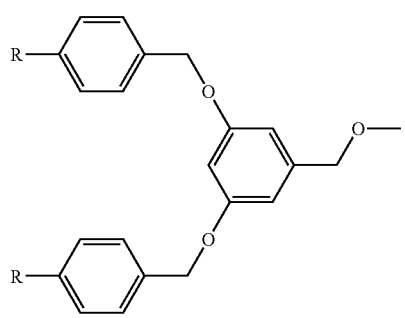

Formula (12)

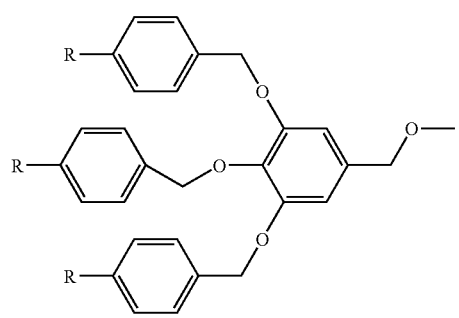

Formula (13)

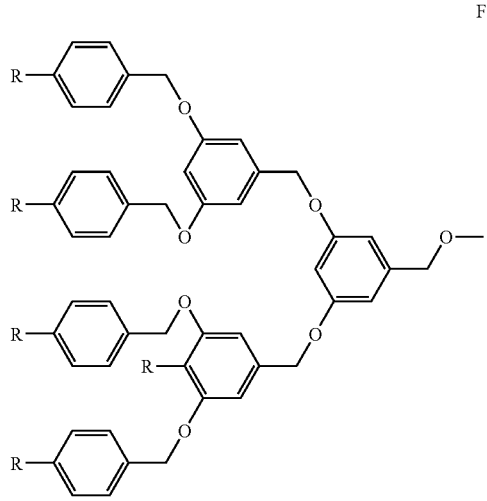

Formula (14)

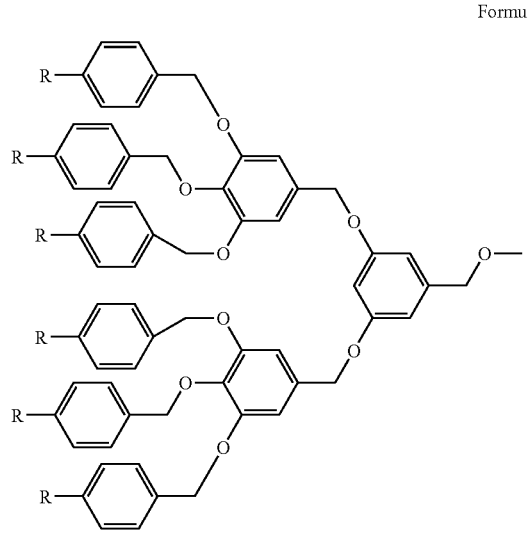

Formula (15)

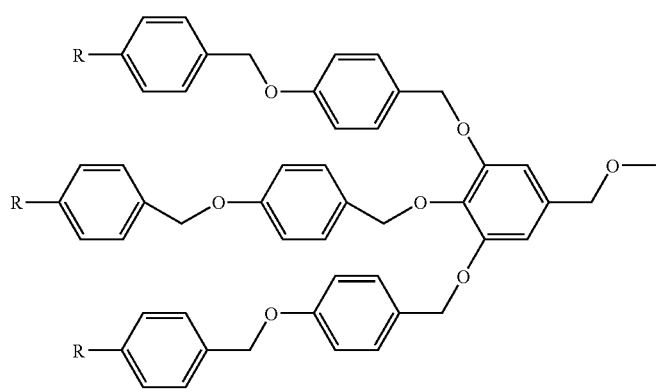

Formula (16)

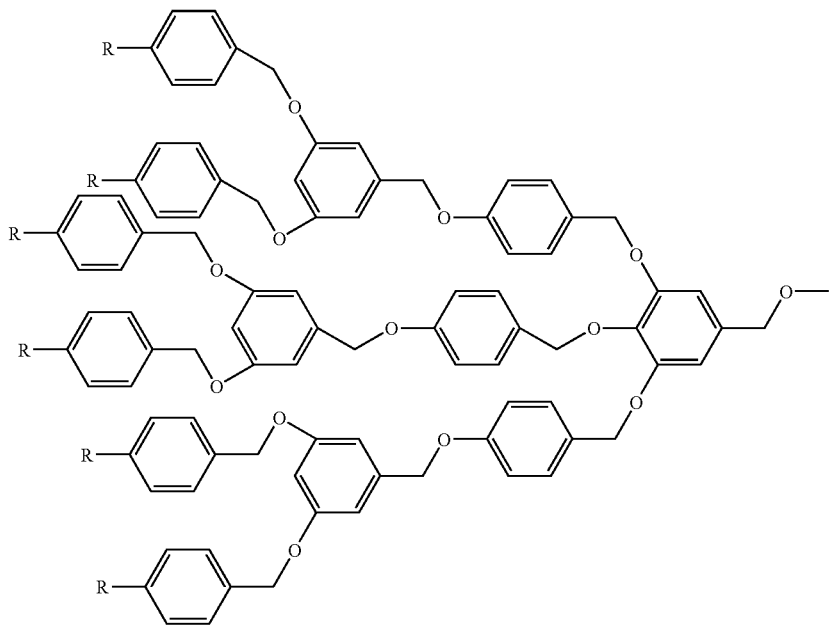

Formula (17)

where R is any one of —SO₃H, —COOH, —OH, and —OPO(OH)₃.

9. The polymer electrolyte membrane of claim 1, wherein the proton-conducting polymer is at least one selected from the group consisting of polyimides, polyalkylethers, polyetheretherketone, polyethersulfone, NAFION, polyvinylalcohols and copolymers thereof.

10. The polymer electrolyte membrane of claim 1, comprising 1-90 parts by weight of the inorganic nanoparticle bonded with the proton-conducting group and 0.1-50 parts by weight of the polymeric solid acid, based on 100 parts by weight of the proton-conducting polymer.

11. A fuel cell comprising:
a membrane-electrode assembly including a cathode having a catalyst layer and a diffusion layer;
an anode having a catalyst layer and a diffusion layer; and
an electrolyte membrane interposed between the cathode and the anode,
wherein the electrolyte membrane is a polymer electrolyte membrane comprising:
a plurality of inorganic nanoparticles, each of the inorganic nanoparticles being bonded with at least one proton-conducting group,
a polymeric solid acid and
a proton-conducting polymer.

12. The fuel cell of claim 11, wherein each inorganic nanoparticle bonded with the at least one proton-conducting group is obtained by reacting a compound comprising the proton-conducting group with a metal precursor.

13. The fuel cell of claim 12, wherein the metal precursor is a compound represented by Formula 1 or 2 below:

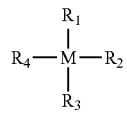

Formula (1)

where M is Si, Ti or Zr,
and $R_1$, $R_2$, $R_3$ and $R_4$ are each independently a $C_1$-$C_{20}$ alkyl group, a $C_6$-$C_{20}$ aryl group, a $C_1$-$C_{20}$ alkoxy group, a $C_7$-$C_{20}$ alkylaryl group, a $C_7$-$C_{20}$ arylalkyl group, a $C_2$-$C_{20}$ alkenyl group, a $C_8$-$C_{20}$ arylalkenyl group, a $C_2$-$C_{20}$ alkynyl group, a hydroxyl group, a nitro group or an amino group, wherein at least one of $R_1$, $R_2$, $R_3$ and $R_4$ is a $C_1$-$C_{20}$ alkoxy group; and

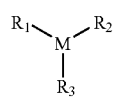

Formula (2)

where M is Al or B,
and $R_1$, $R_2$ and $R_3$ are each independently a $C_1$-$C_{20}$ alkyl group, a $C_6$-$C_{20}$ aryl group, a $C_1$-$C_{20}$ alkoxy group, a $C_7$-$C_{20}$ alkylaryl group, a $C_7$-$C_{20}$ arylalkyl group, a $C_2$-$C_{20}$ alkenyl group, a $C_8$-$C_{20}$ arylalkenyl group, a $C_2$-$C_{20}$ alkynyl group, a hydroxyl group, a nitro group, or an amino group, wherein at least one of $R_1$, $R_2$ and $R_3$ is a $C_1$-$C_{20}$ alkoxy group.

14. The fuel cell of claim 11, wherein the polymeric solid acid has a main chain having a polymerization of 10-70 and a side chain that is bound to a repeating unit of the main chain and represented by Formula 3 below:

$$-E_1\text{-}\ldots\text{-}E_i\text{-}\ldots\text{-}E_n \qquad \text{Formula (3)}$$

where each $E_i$ included in $E_1$ through $E_{n-1}$ is independently any one of the organic groups represented by Formulae 4 through 8 below;

Formula (4)

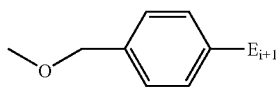

Formula (5)

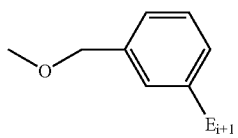

Formula (6)

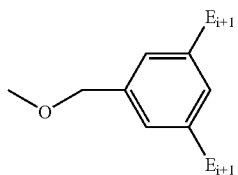

Formula (7)

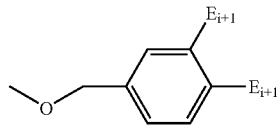

Formula (8)

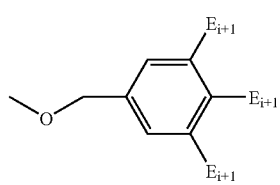

each $E_{i+1}$ in Formulae 6 through 8 is independently the same or different;

the number of $E_{i+1}$ of the $(i+1)^{th}$ generation bonded with $E_i$ of the $i^{th}$ generation is the same as the number of available bonds existing in $E_i$;

n refers to the generation of a branch unit and is an integer in the range of 2-4; and $E_n$ is any one of —SO$_3$H, —COOH, —OH, or —OPO(OH)$_3$.

15. The fuel cell of claim 14, wherein the side chain of the polymeric solid acid is any one of the compounds represented by Formulae 12 through 17 below:

Formula (12)

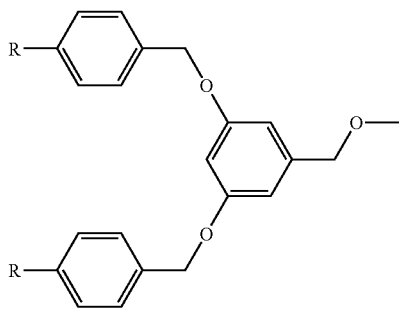

Formula (13)

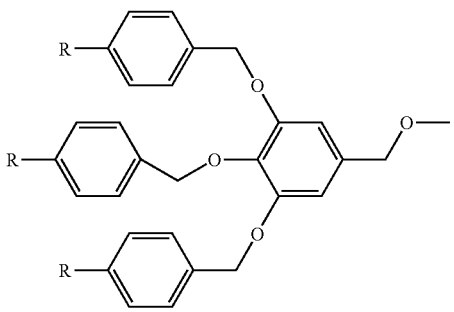

Formula (14)

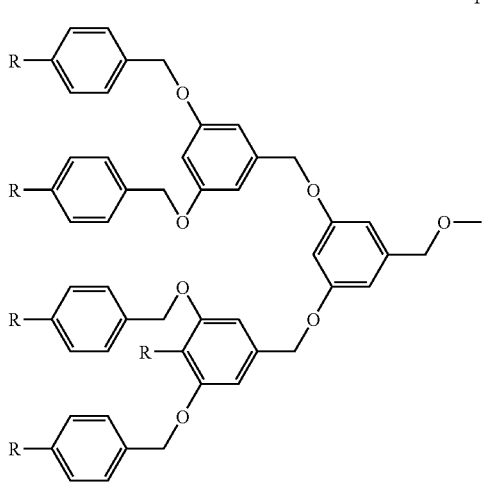

Formula (15)

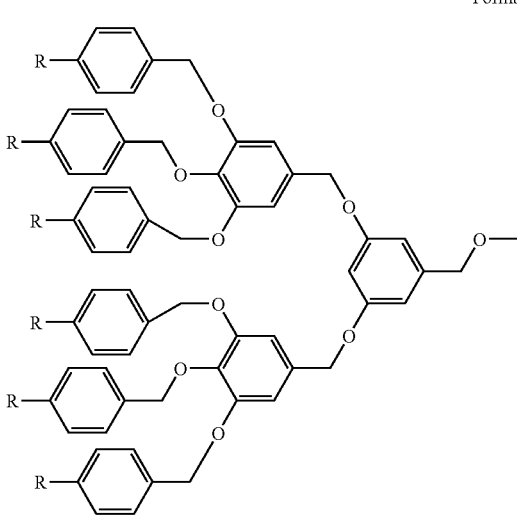

-continued

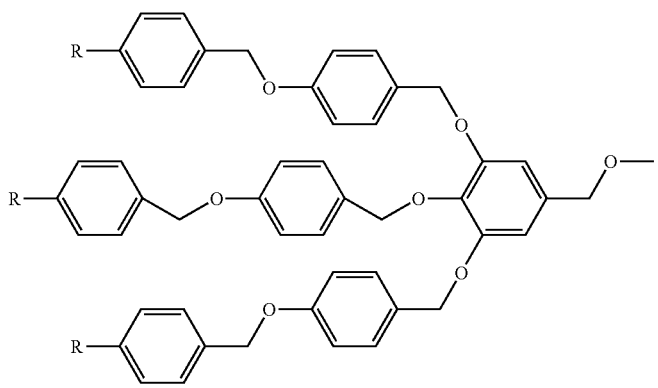

Formula (16)

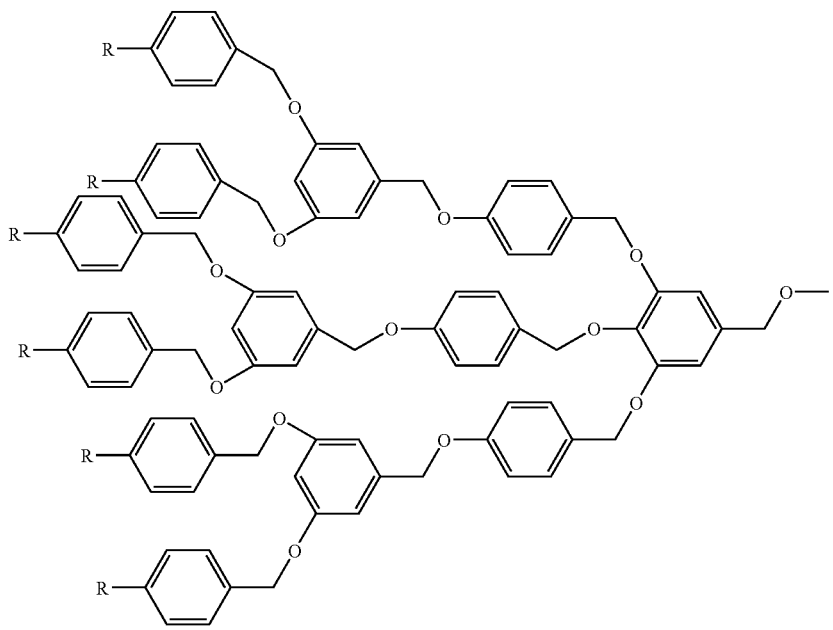

Formula (17)

where R is any one of —SO₃H, —COOH, —OH, and —OPO(OH)₃.

16. The fuel cell of claim 11, wherein the proton-conducting polymer is at least one selected from the group consisting of polyimides, polyalkylethers, polyetheretherketone, polyethersulfone, NAFION, polyvinylalcohols and copolymers thereof.

17. The fuel cell of claim 11, comprising 1-90 parts by weight of the inorganic nanoparticle bonded with the proton-conducting group and 0.1-50 parts by weight of the polymeric solid acid, based on 100 parts by weight of the proton-conducting polymer.

18. A method of preparing a polymer electrolyte membrane comprising:
adding a compound comprising a proton-conducting group to a compound represented by Formula 1 or 2 below and stirring the mixture, and then adding water to the resulting product to prepare a plurality of inorganic nanoparticles, each of the inorganic nanoparticles being bonded with at least one proton-conducting group in a sol-type form, and thus forming a sol-type composition;

supplying a composition for preparing a polymer electrolyte membrane comprising the sol-type composition, a proton-conducting polymer, a polymeric solid acid and a solvent;
applying the composition for preparing the polymer electrolyte membrane on a substrate; and
drying the applied composition for preparing the polymer electrolyte membrane:

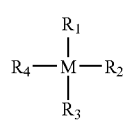

Formula (1)

where M is Si, Ti or Zr,
and $R_1$, $R_2$, $R_3$ and $R_4$ are each independently a $C_1$-$C_{20}$ alkyl group, a $C_6$-$C_{20}$ aryl group, a $C_1$-$C_{20}$ alkoxy group, a $C_7$-$C_{20}$ alkylaryl group, a $C_7$-$C_{20}$ arylalkyl group, a $C_2$-$C_{20}$ alkenyl group, a $C_8$-$C_{20}$ arylalkenyl group, a $C_2$-$C_{20}$ alkynyl group, a hydroxyl group, a nitro group or an amino group, wherein at least one of $R_1$, $R_2$, $R_3$ and $R_4$ is a $C_1$-$C_{20}$ alkoxy group; and

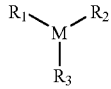

Formula (2)

where M is Al or B, and $R_1$, $R_2$ and $R_3$ are each independently a $C_1$-$C_{20}$ alkyl group, a $C_6$-$C_{20}$ aryl group, a $C_1$-$C_{20}$ alkoxy group, a $C_7$-$C_{20}$ alkylaryl group, a $C_7$-$C_{20}$ arylalkyl group, a $C_2$-$C_{20}$ alkenyl group, a $C_8$-$C_{20}$ arylalkenyl group, a $C_2$-$C_{20}$ alkynyl group, a hydroxyl group, a nitro group, or an amino group, wherein at least one of $R_1$, $R_2$ and $R_3$ is a $C_1$-$C_{20}$ alkoxy group.

19. The method of claim 18, wherein the compound comprising the proton-conducting group is $ClSO_3H$.

20. The method of claim 18, wherein the solvent is at least one selected from the group consisting of N-methyl-2-pyrrolidone, dimethylformamide, methylsulfoxide, dimethylsulfoxide and N,N'-dimethylacetamide.

* * * * *

UNITED STATES PATENT AND TRADEMARK OFFICE
CERTIFICATE OF CORRECTION

PATENT NO.         : 8,124,294 B2                                          Page 1 of 2
APPLICATION NO.    : 11/694730
DATED              : February 28, 2012
INVENTOR(S)        : Jin-gyu Lee et al.

It is certified that error appears in the above-identified patent and that said Letters Patent is hereby corrected as shown below:

In the Claims

Column 21, Claim 6, line 2          Before "generation"
         Insert -- $i^{th}$ --

Column 21, Claim 6, Formula (14)      Delete

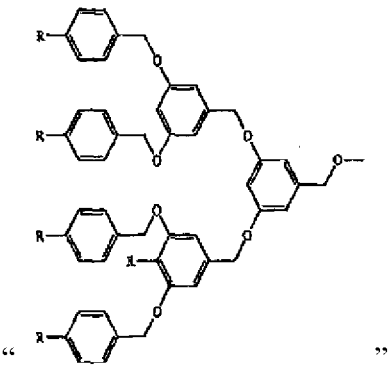

"                                                                            "

Insert

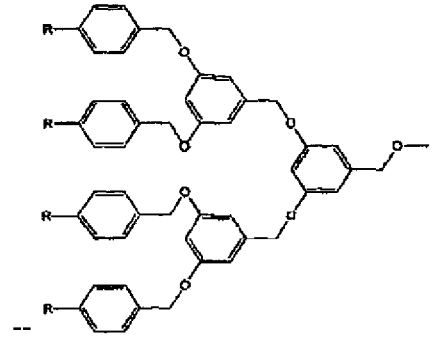

--                   --

Signed and Sealed this
Tenth Day of June, 2014

Michelle K. Lee
*Deputy Director of the United States Patent and Trademark Office*

CERTIFICATE OF CORRECTION (continued)
U.S. Pat. No. 8,124,294 B2

Column 25, Claim 14, Formula (14)    Delete

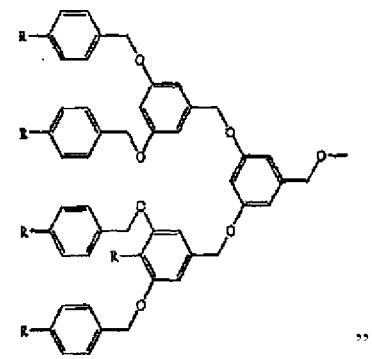

"  "

Insert

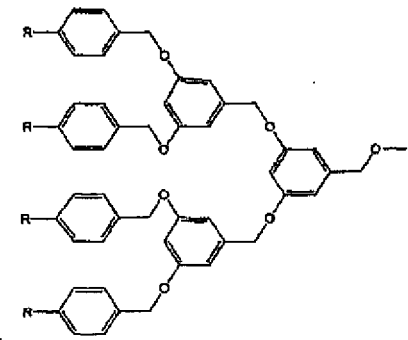

-- --